(12) United States Patent
Hirai et al.

(10) Patent No.: US 11,577,201 B2
(45) Date of Patent: Feb. 14, 2023

(54) CONTROL DEVICE FOR FLUE GAS DENITRIZER, BOILER FACILITY, CONTROL METHOD FOR FLUE GAS DENITRIZER, AND CONTROL PROGRAM FOR FLUE GAS DENITRIZER

(71) Applicant: MITSUBISHI HEAVY INDUSTRIES, LTD., Tokyo (JP)

(72) Inventors: Tsuyoshi Hirai, Yokohama (JP); Satoru Shishido, Yokohama (JP); Tsuyoshi Yamaguchi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/590,130

(22) Filed: Feb. 1, 2022

(65) Prior Publication Data
US 2022/0297061 A1     Sep. 22, 2022

(30) Foreign Application Priority Data

Mar. 17, 2021  (JP) .............................. JP2021-043262

(51) Int. Cl.
*B01D 53/86*   (2006.01)
*B01D 53/90*   (2006.01)

(52) U.S. Cl.
CPC ..... *B01D 53/8696* (2013.01); *B01D 53/8631* (2013.01); *B01D 53/90* (2013.01); *B01D 2251/2062* (2013.01); *B01D 2257/404* (2013.01); *B01D 2258/0283* (2013.01)

(58) Field of Classification Search
CPC ................. B01D 53/8696; B01D 53/90; B01D 53/8631; B01D 2258/0283; B01D 2251/2062; B01D 2257/404; B01D 53/56; F23J 15/00; F23J 15/003; G05B 1/00; G05B 6/00; G05B 11/00; G05B 15/00; G05D 7/00; G05D 21/00; G05D 2201/00
See application file for complete search history.

(56) References Cited

U.S. PATENT DOCUMENTS 4,473,537 A * 9/1984 Ford, Jr. ............ B01D 53/8696
                                                          422/111

FOREIGN PATENT DOCUMENTS

JP    H08-103628 A    4/1996
JP    2014-100630 A   6/2014

* cited by examiner

*Primary Examiner* — Timothy C Vanoy
(74) *Attorney, Agent, or Firm* — WHDA, LLP

(57) ABSTRACT

A control device for controlling a flue gas denitrizer including a reductant supply part for supplying a reductant to an exhaust gas passage to which an exhaust gas from a boiler is introduced. The control device comprises: a storage part which stores a plurality of opening degree patterns of a plurality of first valves corresponding to a plurality of operational states of the boiler respectively; an opening degree pattern acquisition part configured to acquire an opening degree pattern corresponding to a present operational state of the boiler among the plurality of opening degree patterns from the storage part; and a first valve control part configured to regulate an opening degree of each of the plurality of first valves, on the basis of the opening degree pattern acquired by the opening degree pattern acquisition part.

10 Claims, 5 Drawing Sheets

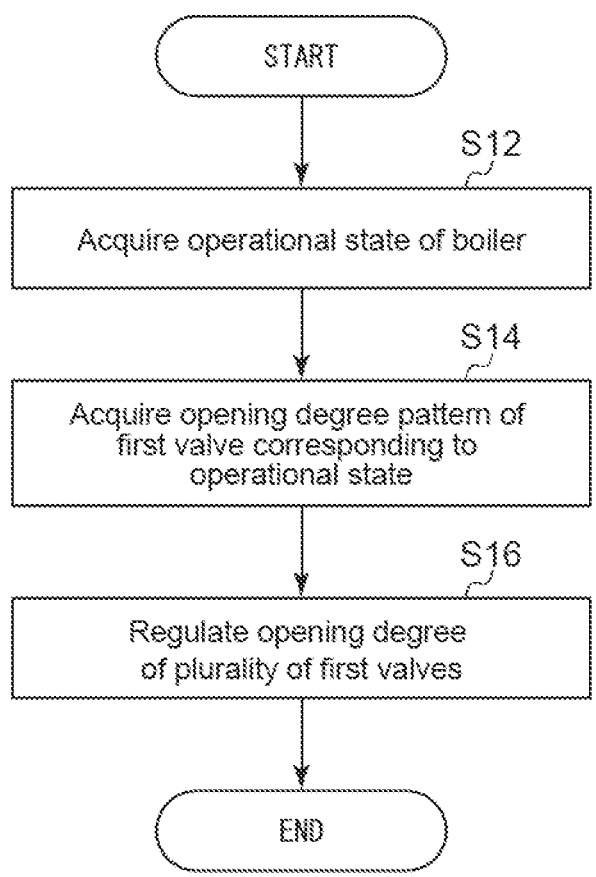

CONTROL DEVICE FOR FLUE GAS DENITRIZER, BOILER FACILITY, CONTROL METHOD FOR FLUE GAS DENITRIZER, AND CONTROL PROGRAM FOR FLUE GAS DENITRIZER

TECHNICAL FIELD

The present disclosure relates to a control device for a flue gas denitrizer, a boiler facility, a control method for a flue gas denitrizer, and a control program for a flue gas denitrizer.

BACKGROUND

A flue gas denitrizer for removing or reducing nitrogen oxides (NOx) contained in exhaust gas from a combustion facility by decomposing them into harmless nitrogen and water through reaction with a reductant is known. In such a flue gas denitrizer, if the supply amount of the reductant is too small, nitrogen oxides in the exhaust gas cannot be sufficiently reduced, while if the supply amount of the reductant is too much, the equipment may be adversely affected by an unreacted reductant. Therefore, a configuration has been proposed to appropriately regulate the supply amount of the reductant in the flue gas denitrizer.

Patent Document 1 discloses a denitration system equipped with an ammonia injection device for injecting ammonia as a reductant into exhaust gas from a boiler, a denitration catalyst disposed downstream of the ammonia injection device in an exhaust gas passage, and a regulating means for regulating the amount of ammonia injected from the ammonia injection device. The regulating means is configured to regulate the reductant supply amount on the basis of NOx concentration distribution in a cross-section of the exhaust gas passage at the outlet side of the denitration catalyst so that more ammonia is supplied to a region where denitration is insufficient (i.e., where the NOx concentration is relatively high).

CITATION LIST

Patent Literature

Patent Document 1: JP2014-100630A

SUMMARY

In the denitration system of Patent Document 1, the supply amount of ammonia (reductant) in each region in the exhaust gas passage cross-section is regulated on the basis of NOx concentration distribution in the passage cross-section. In this case, it is necessary to constantly or periodically measure the NOx concentration at multiple positions in the passage cross-section, as needed, in order to obtain the NOx concentration distribution. This makes the device configuration more complicated or increases the cost of the device.

In view of the above, an object of at least one embodiment of the present invention is to provide a control device for a flue gas denitrizer, a boiler facility, a control method for a flue gas denitrizer, and a control program for a flue gas denitrizer whereby it is possible to appropriately regulate the supply amount of the reductant with a simple configuration.

A control device for a flue gas denitrizer according to at least one embodiment of the present invention is a control device for controlling a flue gas denitrizer including a reductant supply part for supplying a reductant to an exhaust gas passage to which an exhaust gas from a boiler is introduced. The reductant supply part includes a plurality of nozzles configured to supply the reductant to a plurality of different positions in a space in the exhaust gas passage respectively, and a plurality of first valves for regulating a supply amount of the reductant to the plurality of nozzles respectively. The control device comprises: a storage part which stores a plurality of opening degree patterns of the plurality of first valves corresponding to a plurality of operational states of the boiler respectively; an opening degree pattern acquisition part configured to acquire an opening degree pattern corresponding to a present operational state of the boiler among the plurality of opening degree patterns from the storage part; and a first valve control part configured to regulate an opening degree of each of the plurality of first valves, on the basis of the opening degree pattern acquired by the opening degree pattern acquisition part.

Further, a boiler facility according to at least one embodiment of the present invention comprises: a boiler including a combustion furnace for combusting fuel; a flue gas denitrizer including a reductant supply part for supplying a reductant to an exhaust gas passage to which an exhaust gas from the boiler is introduced; and the above-described control device configured to control the flue gas denitrizer.

A control method for a flue gas denitrizer according to at least one embodiment of the present invention is a control method for controlling a flue gas denitrizer including a reductant supply part for supplying a reductant to an exhaust gas passage to which an exhaust gas from a boiler is introduced. The reductant supply part includes a plurality of nozzles configured to supply the reductant to a plurality of different positions in a space in the exhaust gas passage respectively, and a plurality of first valves for regulating a supply amount of the reductant to the plurality of nozzles respectively. The control method comprises: a step of acquiring, from a storage part which stores a plurality of opening degree patterns of the plurality of first valves corresponding to a plurality of operational states of the boiler respectively, an opening degree pattern corresponding to a present operational state of the boiler among the plurality of opening degree patterns; and a step of regulating an opening degree of each of the plurality of first valves, on the basis of the acquired opening degree pattern.

A control program for a flue gas denitrizer according to at least one embodiment of the present invention is a control program for controlling a flue gas denitrizer including a reductant supply part for supplying a reductant to an exhaust gas passage to which an exhaust gas from a boiler is introduced. The reductant supply part includes a plurality of nozzles configured to supply the reductant to a plurality of different positions in a space in the exhaust gas passage respectively, and a plurality of first valves for regulating a supply amount of the reductant to the plurality of nozzles respectively. The control program is configured to cause a computer to execute: a process of acquiring, from a storage part which stores a plurality of opening degree patterns of the plurality of first valves corresponding to a plurality of operational states of the boiler respectively, an opening degree pattern corresponding to a present operational state of the boiler among the plurality of opening degree patterns; and a process of regulating an opening degree of each of the plurality of first valves, on the basis of the acquired opening degree pattern.

At least one embodiment of the present invention provides a control device for a flue gas denitrizer, a boiler facility, a control method for a flue gas denitrizer, and a control program for a flue gas denitrizer whereby it is possible to appropriately regulate the supply amount of the reductant with a simple configuration.

BRIEF DESCRIPTION OF DRAWINGS

FIG. 5 is a flowchart of a control method for a flue gas denitrizer according to an embodiment.

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

Configuration of Boiler Facility

Figure 1:
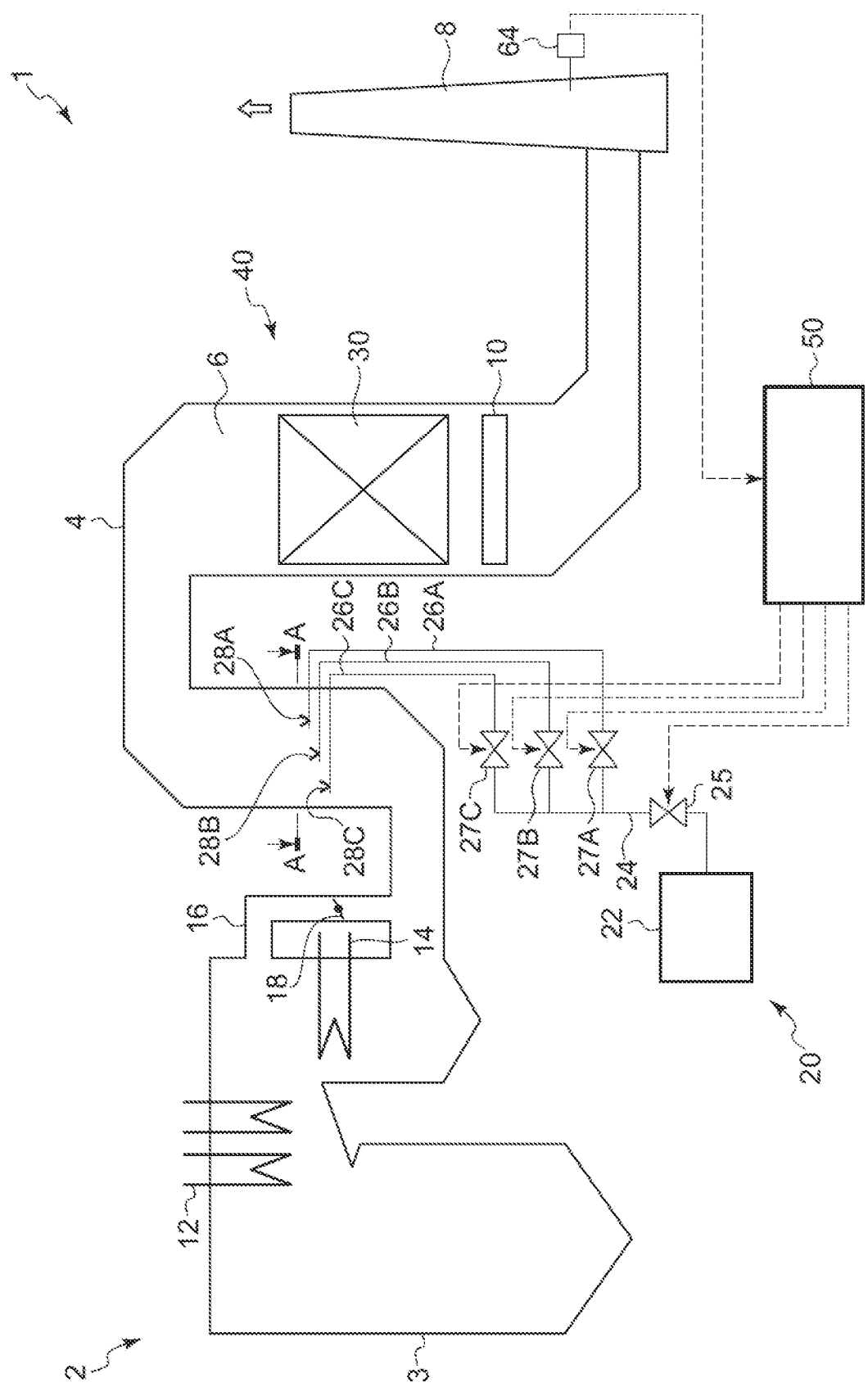
FIG. 1 is a schematic configuration diagram of a boiler facility according to an embodiment.

FIG. 1 is a schematic configuration diagram of a combustion facility including a flue gas denitrizer to be controlled by a control device or a control method according to some embodiments. The boiler facility 1 shown in FIG. 1 includes a boiler 2 including a combustion furnace 3 for combusting fuel, a flue gas duct 4 connected to the boiler 2, and a flue gas denitrizer 40 for removing or reducing nitrogen oxides (NOx) from the exhaust gas flowing through the flue gas duct 4. The flue gas duct 4 forms an exhaust gas passage 6 to which the exhaust gas (combustion gas) from the combustion furnace 3 is introduced. Further, the boiler facility 1 includes a control device 50 for controlling the flue gas denitrizer 40.

The boiler 2 is configured to produce steam. The boiler 2 includes a heat transfer tube 12, 14 and heats a fluid supplied to the heat transfer tube through heat exchange with the exhaust gas flowing through the exhaust gas passage 6. The steam produced by the boiler 2 is used to drive a steam turbine (not shown) connected to a generator (not shown).

The flue gas denitrizer 40 includes a reductant supply part 20 for supplying a reductant (reducing agent) into the exhaust gas passage 6 and a catalytic part 30 disposed downstream of the reductant supply part 20 in the exhaust gas passage 6. The reductant supply part 20 and the catalytic part 30 may be disposed downstream of the heat transfer tube 12, 14 in the exhaust gas passage 6.

The reductant supply part 20 is configured to supply a reductant having an effect of reducing nitrogen oxides (NOx) in the exhaust gas to the exhaust gas passage 6. The reductant may include ammonia, urea, or a compound containing either of them. Nitrogen oxides in the exhaust gas is decomposed into nitrogen and water by reaction with the reductant. The reductant supply part 20 may be configured to supply a reductant in the form of droplet or gas to the exhaust gas passage 6. A detailed configuration of the reductant supply part 20 will be described later.

The catalytic part 30 includes a denitration catalyst for promoting the reaction between the reductant and nitrogen oxides in the exhaust gas. The denitration catalyst includes a carrier and a catalytic component supported by the carrier. The catalytic component is a substance that promotes the reaction between the reductant and nitrogen oxides, and includes, for example, vanadium and tungsten.

The exhaust gas from which nitrogen oxides have been removed or reduced by the flue gas denitrizer 40 is discharged to the outside through a portion of the exhaust gas passage 6 downstream of the flue gas denitrizer 40 and a stack 8. An air preheater 10 for heating a fluid (e.g., air) or the like through heat exchange with the exhaust gas may be disposed downstream of the flue gas denitrizer 40 in the exhaust gas passage 6. Further, a device for removing or reducing sulfur oxides (SOx) and soot such as combustion ash contained in the exhaust gas may be disposed downstream of the flue gas denitrizer 40 in the exhaust gas passage 6.

The boiler facility shown in FIG. 1 includes a bypass passage 16 branching from the exhaust gas passage 6 and a damper 18 disposed in the bypass passage 16. The bypass passage 16 is disposed so as to branch from the exhaust gas passage 6 at a position upstream of the heat transfer tube 14 and join the exhaust gas passage 6 at a position downstream of the heat transfer tube 14 and upstream of the catalytic part 30 of the flue gas denitrizer 40. In other words, the bypass passage 16 is disposed so as to bypass the heat transfer tube 14 disposed in the exhaust gas passage 6. As shown in FIG. 1, the bypass passage 16 may be disposed so as to branch from the exhaust gas passage 6 at a position downstream of the heat transfer tube 12 and upstream of the heat transfer tube 14.

When the damper 18 is closed, the entire exhaust gas from the combustion furnace 3 passes through the heat transfer tube 14 and enters the catalytic part 30. Thus, relatively low temperature exhaust gas cooled through heat exchange in the heat transfer tube 14 enters the catalytic part 30. On the other hand, when the damper 18 is open, part of the exhaust gas from the combustion furnace 3 passes through the heat transfer tube 14 and enters the catalytic part 30, while the remainder of the exhaust gas bypasses the heat transfer tube 14 (without passing through the heat transfer tube 14) and enters the catalytic part 30. Thus, as compared with the case where the damper 18 is closed, relatively high temperature exhaust gas can enter the catalytic part 30. The temperature of the exhaust gas flowing into the catalytic part 30 after joining the passage may be adjusted by regulating the opening degree of the damper 18.

At the time of starting the boiler facility 1 or during low load operation, the exhaust gas flowing into the catalytic part 30 is unlikely to be hot, and therefore, the reaction rate between the reductant and nitrogen oxides may not sufficiently increase in the catalytic part 30. In this case, by opening the damper 18, relatively high temperature exhaust gas can flow into the catalytic part 30. Thus, by increasing the temperature of the exhaust gas flowing into the catalytic part 30, it is possible to promote the reaction between the reductant and nitrogen oxides. Further, when the boiler facility 1 is shifted from the start-up or low load operation to the normal load operation, the temperature of the exhaust gas flowing into the catalytic part 30 can be increased to a temperature at which the catalyst can be used (for example 300° C.) or higher by regulating the opening degree of the damper 18. Thus, in the catalytic part, deposition of substances such as acidic ammonium sulfate, which adversely affects the catalyst, can be suppressed.

The boiler facility 1 further includes a NOx concentration measuring part 64 configured to measure the concentration of nitrogen oxides (NOx; nitrogen dioxide ($NO_2$), nitric oxide (NO), etc.) in the exhaust gas at a position downstream of the flue gas denitrizer 40 in the exhaust gas passage 6. In the exemplary embodiment shown in FIG. 1, the NOx concentration measuring part 64 is configured to measure the NOx concentration at the inlet of the stack 8 (inside of stack 8). In an embodiment, the NOx concentration measuring part 64 may be configured to measure the NOx concentration in the vicinity of the outlet of the catalytic part 30 of the flue gas denitrizer 40. The NOx concentration measuring part 64 may measure the NOx concentration at multiple positions in the passage cross-section and acquires an average of these measurement values as the NOx concentration in the exhaust gas.

The NOx concentration in the exhaust gas can be measured according to JIS K 0104 by using a chemiluminescent NOx meter (JIS B 7982) or by a zinc reduction naphthylethylenediamine absorptiometry (Zn-NEDA method).

Figure 2:
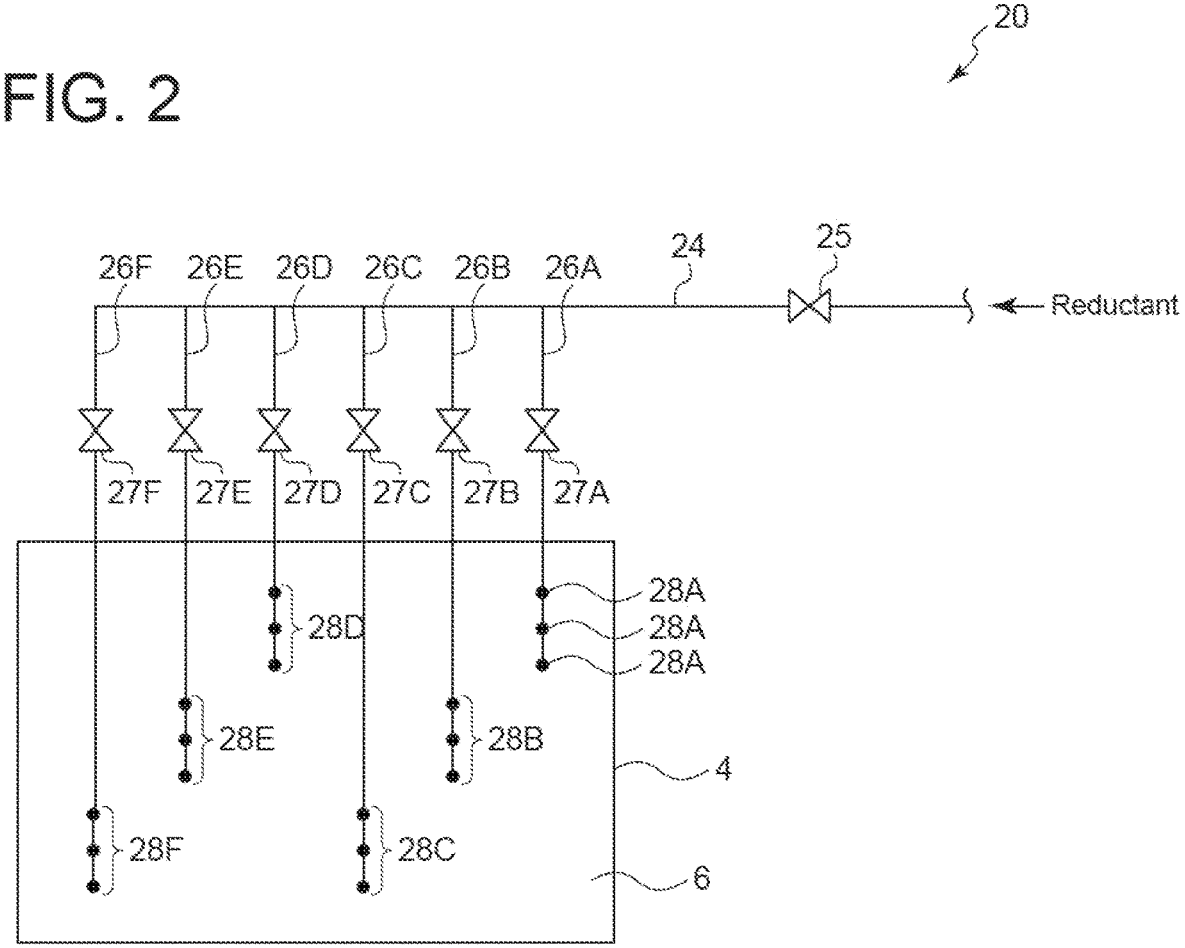
FIG. 2 is a schematic configuration diagram of a flue gas denitrizer in the boiler facility shown in FIG. 1.

FIG. 2 is a schematic configuration diagram of the reductant supply part 20 of the flue gas denitrizer 40 shown in FIG. 1, as viewed along line A-A in FIG. 1. FIG. 2 is a schematic diagram showing the interior of the flue gas duct 4, when viewed from the exhaust gas flow direction.

As shown in FIGS. 1 and 2, the reductant supply part 20 includes a reductant storage part 22 for storing the reductant, and a plurality of nozzles 28A to 28F (hereinafter, nozzle 28) each of which is configured to supply the reductant from the reductant storage part 22 into the exhaust gas passage 6. Between the reductant storage part 22 and the plurality of nozzles 28, a reductant supply line 24 connected to the reductant storage part 22 and a plurality of branch lines 26A to 26F branching from the reductant supply line 24 are disposed. The nozzles 28 are supplied with the reductant through the respective branch lines 26.

The reductant supply line 24 is provided with a second valve 25 for regulating the flow rate of the reductant in the reductant supply line 24. The branch lines 26A to 26F are each provided with at least one or more nozzles 28A to 28F and a first valve 27A to 27F (hereinafter referred to as first valve 27) for regulating the supply amount of the reductant supplied to the nozzle 28A to 28F. In other words, the total supply amount of the reductant to the nozzles 28 depends on the opening degree of the second valve 25. Further, the nozzles 28 are supplied with the reductant at a distribution ratio depending on the opening degrees of the first valves 27 respectively corresponding to the nozzles 28.

Due to limitations of space, FIG. 1 shows only some of the plurality of branch lines 26, the plurality of first valves 27, and the plurality of nozzles 28 shown in FIG. 2. Further, although FIG. 2 shows six branch lines 26, first valves 27, and nozzles 28, the number of branch lines 26, first valves 27, and nozzles 28 is not limited thereto.

As shown in FIG. 2, the plurality of nozzles 28 is configured to supply the reductant to a plurality of different positions in a space in the exhaust gas passage 6. The nozzles 28 may be arranged in a grid shape when viewed from the exhaust gas flow direction in the exhaust gas passage 6.

Figure 3:
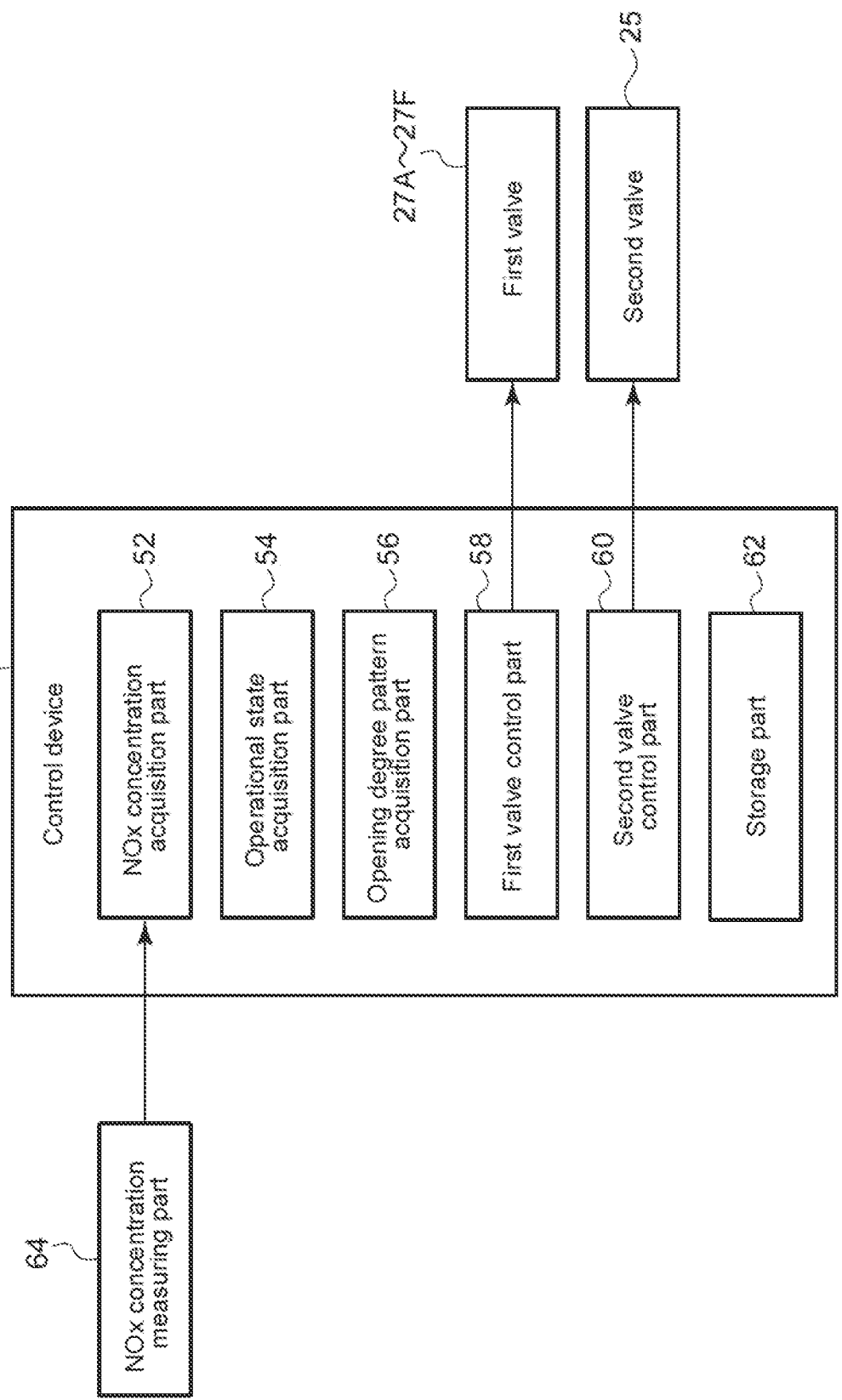
FIG. 3 is a schematic configuration diagram of a control device according to an embodiment.
Figure 4:
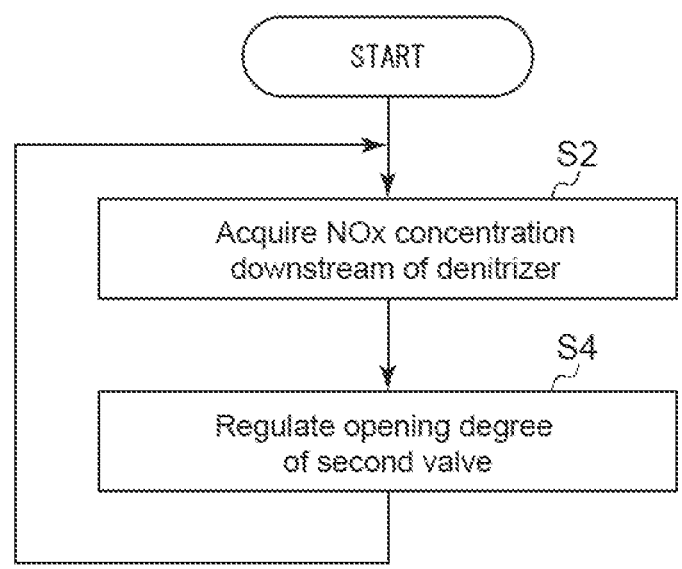
FIG. 4 is a flowchart of a control method for a flue gas denitrizer according to an embodiment.

FIG. 3 is a schematic configuration diagram of the control device 50 according to an embodiment. As shown in FIG. 4, the control device 50 includes a NOx concentration acquisition part 52, an operational state acquisition part 54, an opening degree pattern acquisition part 56, a first valve control part 58, a second valve control part 60, and a storage part 62.

The control device 50 includes a calculator equipped with a processor (e.g., CPU), a storage device (memory device; e.g., RAM), an auxiliary storage part, and an interface. The control device 50 receives a signal indicating a measurement value of the NOx concentration from the NOx concentration measuring part 64 via the interface. The processor is configured to process the signal thus received. In addition, the processor is configured to process a program loaded into the storage device. Thus, the function of each functional unit (NOx concentration acquisition part 52, operational state acquisition part 54, opening degree pattern acquisition part 56, first valve control part 58 or second valve control part 60, etc.) is implemented.

The processing contents in the control device 50 may be implemented as programs executed by the processor. The programs may be stored in the auxiliary memory. When executed, these programs are loaded into the storage device. The processor reads out the programs from the storage device to execute instructions included in the programs.

The storage part 62 may include the main storage part or the auxiliary storage part constituting the control device 50. Alternatively, the storage part 62 may include a remote storage device connected to the calculator via a network.

The NOx concentration acquisition part 52 is configured to acquire the measurement value of the NOx concentration in the exhaust gas by the NOx concentration measuring part 64. The NOx concentration acquisition part 52 may be configured to receive the measurement value from the NOx concentration measuring part 64 for each predetermined sampling period.

The operational state acquisition part 54 is configured to acquire a present operational state of the boiler 2. The operational state acquisition part 54 may receive the present operational state of the boiler 2 by receiving a signal indicating the present operational state from an operation control device (high order control device) of the boiler 2. Alternatively, the storage part 62 of the control device 50 may store the present operational state of the boiler 2, and the operational state acquisition part 54 may read out the present operational state stored in the storage part 62.

The operational state acquisition part 54 may be configured to acquire the operational load of the boiler 2, the type of fuel used in the boiler 2, or the opening degree of the damper 18 as the operational state of the boiler 2. The operational load of the boiler 2 may be represented by the exhaust gas flow rate at a specific position in the flue gas duct 4. Further, the operational load of the boiler 2 may be represented by the amount of steam produced by the boiler 2, the amount of power generation, the amount of heat input to the boiler 2, the amount of fuel, the amount of air, the amount of feedwater, etc., or may be represented by command values thereof transmitted from the operation control device of the boiler 2.

The opening degree pattern acquisition part 56 is configured to read out and acquire an opening degree pattern corresponding to the operational state acquired by the operational state acquisition part 54 (i.e., present operational state) from among a plurality of opening degree patterns stored in the storage part 62. Here, the opening degree pattern indicates a combination of opening degrees of the plurality of first valves 27 (27A to 27F) of the reductant supply part 20.

The first valve control part 58 is configured to regulate the opening degree of each of the first valves 27 (27A to 27F) of the reductant supply part 20, on the basis of the opening degree pattern acquired by the opening degree pattern acquisition part 56 (i.e., the opening degree pattern corresponding to the present operational state). The first valve control part 58 may transmit an opening degree command signal based on the opening degree pattern to each of the first valves 27.

The second valve control part 60 is configured to regulate the opening degree of the second valve 25 of the reductant supply part 20, on the basis of the NOx concentration in the exhaust gas acquired by the NOx concentration acquisition part 52. The second valve control part 60 may calculate an opening degree command value of the second valve 25 on the basis of the NOx concentration in the exhaust gas acquired by the NOx concentration acquisition part 52, and transmit an opening degree command signal indicating the opening degree command value to the second valve 25. The opening degree command value of the second valve 25 may be calculated so that the difference (deviation) between a measurement value of the NOx concentration by the NOx concentration acquisition part 52 and a target value of the NOx concentration approaches zero. The target value of the NOx concentration is, for example, an arbitrary value in accordance with the law concerning NOx emissions specified in the country or region to which the boiler facility according to an embodiment belongs.

At least one of the plurality of first valves 27 or the second valve 25 may be a valve the opening degree of which can be automatically controlled by an actuator using air pressure, electric power, hydraulic pressure, or electromagnetic force. Alternatively, at least one of the plurality of first valves 27 or the second valves 25 may be a valve that can be controlled by adding a control mechanism (handle rotation mechanism including motors, gears, etc.) to a manual valve (existing valve, etc.).

The storage part 62 stores a plurality of opening degree patterns of the plurality of first valves 27 respectively corresponding to a plurality of operational states of the boiler 2. The opening degree pattern of the plurality of first valves 27 corresponding to the operational state of the boiler 2 is an opening degree pattern in which the NOx concentration distribution at a position downstream of the flue gas denitrizer 40 in the exhaust gas passage 6 is made uniform by setting the opening degree of each of the first valves 27 on the basis of the opening degree pattern and supplying the reductant to the exhaust gas passage 6. By making the NOx concentration distribution at a position downstream of the flue gas denitrizer 40 in the exhaust gas passage 6 uniform, in each region corresponding to the plurality of nozzles 28 in a passage cross-section of the exhaust gas passage 6, it is possible to appropriately reduce NOx in the exhaust gas, and it is possible to suppress adverse effects on the boiler facility 1 due to an unreacted reductant (for example, deterioration of the catalytic performance of the catalytic part 30 due to generation of acidic ammonium sulfate, increase in differential pressure due to blockage of the air preheater 10).

The storage part 62 may store a plurality of opening degree patterns according to the operational load of the boiler 2, the type of fuel used in the boiler 2, or the opening degree of the damper 18 as the operational state of the boiler 2.

In an embodiment, the storage part 62 stores a plurality of opening degree patterns according to the operational load of the boiler 2. For example, the storage part 62 may store two opening degree patterns corresponding to a high load region and a low load region obtained by dividing the operational load range of the boiler 2 into two.

In an embodiment, the storage part 62 stores a plurality of opening degree patterns according to the flow rate of the exhaust gas at a specific position in the flue gas duct 4. For example, the storage part 62 may store a plurality of opening degree patterns corresponding to a plurality of exhaust gas flow rate regions obtained by dividing the exhaust gas flow rate range into several regions.

In an embodiment, the storage part 62 stores a plurality of opening degree patterns according to the type of fuel used in the boiler 2 (fuel combusted in the boiler 2). For example, when the fuel used in the boiler 2 can be switched between gas fuel and oil fuel, the storage part 62 may store an opening degree pattern corresponding to the use of gas fuel and an opening degree pattern corresponding to the use of oil fuel.

In an embodiment, the storage part 62 stores a plurality of opening degree patterns according to the opening degree of the damper 18 for regulating the flow rate of the exhaust gas in the bypass passage 16 branching from the exhaust gas passage 6 of the boiler 2. For example, the storage part 62 may store an opening degree pattern corresponding to the open state of the damper 18 and an opening degree pattern corresponding to the closed state of the damper 18. Alternatively, for example, the storage part 62 may store a plurality of opening degree patterns corresponding to a plurality of opening degree regions obtained by dividing the opening degree range of the damper 18 into several regions.

The storage part 62 may store a plurality of opening degree patterns previously acquired on the basis of operational experience of the boiler 2, for example.

Control Flow of Flue Gas Denitrizer

Hereinafter, the control flow of the flue gas denitrizer 40 according to some embodiments will be described. FIGS. 4 and 5 are flowcharts of a control method for a flue gas denitrizer according to an embodiment. In the following description, the method of controlling a flue gas denitrizer according to an embodiment using the above-described control device 50 will be described. However, in other embodiments, the control method may be performed using another device, or part or the whole procedure described below may be performed manually.

In some embodiments, the opening degree of the second valve 25 is regulated according to the flowchart shown in FIG. 4, and the opening degrees of the plurality of first valves 27 are regulated according to the flowchart shown in FIG. 5. Steps S2 to S4 shown in FIG. 4 and steps S12 to S16 shown in FIG. 5 may be performed in parallel.

In the following description, it is assumed that the storage part 62 stores, as the plurality of opening degree patterns corresponding to the plurality of operational states of the boiler 2, two opening degree patterns according to the operational load of the boiler 2, specifically, an opening degree pattern corresponding to the operational state in the high load region and an opening pattern corresponding to the operational state in the low load region.

In an embodiment, as shown in FIG. 4, the NOx concentration in the exhaust gas at a position downstream of the flue gas denitrizer 40 in the exhaust gas passage 6 is measured by the NOx concentration measuring part 64, and the measurement value of the NOx concentration is acquired by the NOx concentration acquisition part 52 (S2). The NOx concentration acquisition part 52 may receive the measurement value from the NOx concentration measuring part 64 for each predetermined sampling period.

Then, the opening degree of the second valve 25 of the reductant supply part 20 is regulated by the second valve control part 60, on the basis of the NOx concentration acquired in step S2 (S4). In step S4, an opening degree command value of the second valve 25 may be calculated on the basis of the NOx concentration acquired in step S2.

Further, an opening degree command signal indicating the opening degree command value may be transmitted to the second valve 25.

The procedures of steps S2 to S4 are repeated. Thus, an appropriate total amount of the reductant is supplied to the plurality of nozzles 28 via the second valve 25 so that the NOx concentration in the exhaust gas at a position downstream of the flue gas denitrizer 40 approaches the target value.

Further, as shown in FIG. 5, a present operational state of the boiler is acquired by the operational state acquisition part 54 (S12). In step S12, the present operational state of the boiler 2 may be acquired from the operation control device (high order control device) of the boiler 2 or the storage part 62. Here, it is assumed that a signal indicating that the boiler 2 is in an operational state in the high load region is obtained from the operation control device as the present operational state.

Then, from among the plurality of opening degree patterns stored in the storage part 62 (the opening degree pattern corresponding to the operational state in the high load region and the opening degree pattern corresponding to the operational state in the low load region), the opening degree pattern corresponding to the operational state acquired in step S12, i.e., the opening degree pattern corresponding to the operational state in the high load region is read out and acquired by the opening degree pattern acquisition part 56 (S14).

Then, the opening degree of each of the first valves 27 (27A to 27F) of the reductant supply part 20 is regulated by the first valve control part 58, on the basis of the opening degree pattern acquired in step S14 (i.e., the opening degree pattern corresponding to the operational state in the high load region) (S16). In step S16, an opening degree command signal based on the opening degree pattern may be transmitted to each of the first valves 27.

Thus, the nozzles 28 are supplied with the reductant at a distribution ratio depending on the opening degrees of the first valves 27 respectively corresponding to the nozzles 28. As a result, the NOx concentration distribution at a position downstream of the flue gas denitrizer 40 in the exhaust gas passage 6 can be made uniform.

The procedure of steps S12 to S16 described above may be repeated every time the operational state of the boiler 2 is changed. Specifically, for example, when there is a change in the signal indicating the operational state of the boiler 2 (for example, the signal indicating the operational load) received by the operational state acquisition part 54, the procedure of steps S14 to S16 may be performed using this as a trigger. As a result, even if the operational state of the boiler 2 is changed, the NOx concentration distribution at a position downstream of the flue gas denitrizer 40 in the exhaust gas passage 6 can be made uniform.

When regulating the supply amount of ammonia (reductant) in each region in an exhaust gas passage cross-section on the basis of NOx concentration distribution in the passage cross-section as in the conventional denitration system, it is necessary to measure the NOx concentration at multiple positions in the passage cross-section in order to determine the NOx concentration distribution. This makes the device configuration more complicated or increases the cost of the device.

In this regard, in the control device or the control method according to the above-described embodiments, the plurality of opening degree patterns of the plurality of first valves 27 for regulating the supply amount of the reductant to the plurality of nozzles 28 disposed in the exhaust gas passage 6 is previously stored in the storage part 62, and the opening degree pattern corresponding to the present operational state is acquired from among the plurality of opening degree patterns. Thus, the opening degree of each of the first valves 27 can be appropriately decided. Specifically, the opening degree of each of the first valves 27 can be appropriately decided without measuring the NOx concentration distribution in the exhaust gas passage 6 constantly or periodically. Therefore, the supply amount of the reductant can be appropriately regulated with a simple configuration.

Further, in the above-described embodiments, since the opening degree of the second valve 25 is decided on the basis of the NOx concentration at a position downstream of the flue gas denitrizer 40, a sufficient amount (total amount) of the reductant for the reduction of nitrogen oxides in the exhaust gas can be supplied to the plurality of nozzles 28.

Further, in the above-described embodiments, NOx concentration at the inlet of the stack 8 is acquired. Specifically, since the nitrogen oxide concentration of the exhaust gas that is more homogenized through flow in the exhaust gas passage 6 is acquired, the NOx concentration (average concentration) can be acquired more accurately than when the NOx concentration is acquired at a more upstream position. Therefore, the opening degree of the second valve 25 can be more appropriately regulated on the basis of the NOx concentration thus acquired.

The contents described in the above embodiments would be understood as follows, for instance.

(1) A control device (50) for a flue gas denitrizer (40) according to at least one embodiment of the present invention is a control device for controlling a flue gas denitrizer including a reductant supply part (20) for supplying a reductant to an exhaust gas passage (6) to which an exhaust gas from a boiler (2) is introduced. The reductant supply part includes a plurality of nozzles (28A to 28F) configured to supply the reductant to a plurality of different positions in a space in the exhaust gas passage respectively, and a plurality of first valves (27A to 27F) for regulating a supply amount of the reductant to the plurality of nozzles respectively. The control device comprises: a storage part (62) which stores a plurality of opening degree patterns of the plurality of first valves corresponding to a plurality of operational states of the boiler respectively; an opening degree pattern acquisition part (54) configured to acquire an opening degree pattern corresponding to a present operational state of the boiler among the plurality of opening degree patterns from the storage part; and a first valve control part (58) configured to regulate an opening degree of each of the plurality of first valves, on the basis of the opening degree pattern acquired by the opening degree pattern acquisition part.

According to the above configuration (1), the plurality of opening degree patterns of the plurality of first valves for regulating the supply amount of the reductant to the plurality of nozzles disposed in the exhaust gas passage is previously stored in the storage part, and the opening degree pattern corresponding to the present operational state is acquired from among the plurality of opening degree patterns. Thus, the opening degree of each of the first valves can be appropriately decided. Specifically, the opening degree of each of the first valves can be appropriately decided without measuring the nitrogen oxide (NOx) concentration distribution in the exhaust gas passage. Therefore, the supply amount of the reductant can be appropriately regulated with a simple configuration.

(2) In some embodiments, in the above configuration (1), the plurality of nozzles is configured to supply the reductant to a plurality of different positions when viewed from an exhaust gas flow direction in the exhaust gas passage.

According to the above configuration (2), the plurality of opening degree patterns of the plurality of first valves for regulating the supply amount of the reductant to the plurality of nozzles disposed in the exhaust gas passage is previously stored in the storage part, and the opening degree pattern corresponding to the present operational state is acquired from among the plurality of opening degree patterns. Thus, the opening degree of each of the first valves can be appropriately decided. Specifically, the opening degree of each of the first valves can be appropriately decided without measuring the nitrogen oxide (NOx) concentration distribution in the exhaust gas passage. Therefore, the supply amount of the reductant can be appropriately regulated with a simple configuration.

(3) In some embodiments, in the above configuration (1), the plurality of opening degree patterns includes a plurality of opening degree patterns that vary according to an operational load of the boiler.

The flow characteristics (flow velocity distribution, composition distribution, temperature distribution, etc.) of the exhaust gas in the exhaust gas passage may change according to the operational state of the boiler. In this regard, according to the above configuration (3), since the opening degree pattern corresponding to the present operational load is acquired from among the plurality of opening degree patterns that vary according to the operational load of the boiler, it is possible to easily decide the opening degrees of the plurality of first valves that enable the supply of an appropriate amount of the reductant according to the operational load.

(4) In some embodiments, in any one of the above configurations (1) to (3), the plurality of opening degree patterns includes a plurality of opening degree patterns that vary according to a type of fuel combusted in the boiler.

The flow characteristics of the exhaust gas in the exhaust gas passage may change according to the type of fuel combusted in the boiler. In this regard, according to the above configuration (4), since the opening degree pattern corresponding to the presently used fuel is acquired from among the plurality of opening degree patterns that vary according to the type of fuel, it is possible to easily decide the opening degrees of the plurality of first valves that enable the supply of an appropriate amount of the reductant according to the used fuel.

(5) In some embodiments, in any one of the above configurations (1) to (4), the plurality of opening degree patterns includes a plurality of opening degree patterns that vary according to an opening degree of a damper (18) for regulating a flow rate of an exhaust gas in a bypass passage (16) branching from the exhaust gas passage so as to bypass a heat transfer tube disposed in the exhaust gas passage.

The flow characteristics of the exhaust gas in the exhaust gas passage may change according to the opening degree of the damper disposed in the bypass passage branching from the exhaust gas passage. In this regard, according to the above configuration (5), since the opening degree pattern corresponding to the present opening degree of the damper is acquired from among the plurality of opening degree patterns that vary according to the opening degree of the damper, it is possible to easily decide the opening degrees of the plurality of first valves that enable the supply of an appropriate amount of the reductant according to the opening degree of the damper.

(6) In some embodiments, in any one of the above configurations (1) to (5), the reductant supply part includes: a reductant supply line (24) through which the reductant to be supplied to the plurality of nozzles flows; and a second valve (25) disposed in the reductant supply line. The control device comprises a second valve control part (60) configured to regulate an opening degree of the second valve, on the basis of a nitrogen oxide concentration at a position downstream of the flue gas denitrizer in the exhaust gas passage.

According to the above configuration (6), since the opening degree of the second valve is decided on the basis of the NOx concentration at a position downstream of the flue gas denitrizer, a sufficient amount (total amount) of the reductant for the reduction of nitrogen oxides in the exhaust gas can be supplied to the plurality of nozzles.

(7) In some embodiments, in the above configuration (6), the second valve control part is configured to regulate the opening degree of the second valve, on the basis of a nitrogen oxide concentration at an inlet of a stack (8) for discharging an exhaust gas from the exhaust gas passage.

According to the above configuration (7), the nitrogen oxide concentration at the inlet or the inside of the stack is acquired. That is, since the nitrogen oxide concentration of the exhaust gas that is more homogenized through flow in the exhaust gas passage is acquired, the nitrogen oxide concentration (average concentration) can be acquired more accurately than when the nitrogen oxide concentration is acquired at a more upstream position. Therefore, the opening degree of the second valve can be more appropriately regulated on the basis of the nitrogen oxide concentration thus acquired.

(8) A boiler facility (1) according to at least one embodiment of the present invention comprises: a boiler (2) including a combustion furnace for combusting fuel; a flue gas denitrizer (40) including a reductant supply part (20) for supplying a reductant to an exhaust gas passage to which an exhaust gas from the boiler is introduced; and a control device (50) described in any one of (1) to (7) configured to control the flue gas denitrizer.

According to the above configuration (8), the plurality of opening degree patterns of the plurality of first valves for regulating the supply amount of the reductant to the plurality of nozzles disposed in the exhaust gas passage is previously stored in the storage part, and the opening degree pattern corresponding to the present operational state is acquired from among the plurality of opening degree patterns. Thus, the opening degree of each of the first valves can be appropriately decided. Specifically, the opening degree of each of the first valves can be appropriately decided without measuring the NOx concentration distribution in the exhaust gas passage. Therefore, the supply amount of the reductant can be appropriately regulated with a simple configuration.

(9) A control method for a flue gas denitrizer according to at least one embodiment of the present invention is a control method for controlling a flue gas denitrizer (40) including a reductant supply part (20) for supplying a reductant to an exhaust gas passage (6) to which an exhaust gas from a boiler (2) is introduced. The reductant supply part includes a plurality of nozzles (28A to 28F) configured to supply the reductant to a plurality of different positions in a space in the exhaust gas passage respectively, and a plurality of first valves (27A to 27F) for regulating a supply amount of the reductant to the plurality of nozzles respectively. The control method comprises: a step (S14) of acquiring, from a storage part (62) which stores a plurality of opening degree patterns of the plurality of first valves corresponding to a plurality of operational states of the boiler respectively, an opening degree pattern corresponding to a present operational state of the boiler among the plurality of opening degree patterns;

and a step (S16) of regulating an opening degree of each of the plurality of first valves, on the basis of the acquired opening degree pattern.

According to the above method (9), the plurality of opening degree patterns of the plurality of first valves for regulating the supply amount of the reductant to the plurality of nozzles disposed in the exhaust gas passage is previously stored in the storage part, and the opening degree pattern corresponding to the present operational state is acquired from among the plurality of opening degree patterns. Thus, the opening degree of each of the first valves can be appropriately decided. Specifically, the opening degree of each of the first valves can be appropriately decided without measuring the NOx concentration distribution in the exhaust gas passage. Therefore, the supply amount of the reductant can be appropriately regulated with a simple configuration.

(10) A control program for a flue gas denitrizer according to at least one embodiment of the present invention is a control program for controlling a flue gas denitrizer (40) including a reductant supply part (20) for supplying a reductant to an exhaust gas passage (6) to which an exhaust gas from a boiler (2) is introduced. The reductant supply part includes a plurality of nozzles (28A to 28F) configured to supply the reductant to a plurality of different positions in a space in the exhaust gas passage respectively, and a plurality of first valves (27A to 27F) for regulating a supply amount of the reductant to the plurality of nozzles respectively. The control program is configured to cause a computer to execute: a process of acquiring, from a storage part (62) which stores a plurality of opening degree patterns of the plurality of first valves corresponding to a plurality of operational states of the boiler respectively, an opening degree pattern corresponding to a present operational state of the boiler among the plurality of opening degree patterns; and a process of regulating an opening degree of each of the plurality of first valves, on the basis of the acquired opening degree pattern.

According to the above configuration (10), the plurality of opening degree patterns of the plurality of first valves for regulating the supply amount of the reductant to the plurality of nozzles disposed in the exhaust gas passage is previously stored in the storage part, and the opening degree pattern corresponding to the present operational state is acquired from among the plurality of opening degree patterns. Thus, the opening degree of each of the first valves can be appropriately decided. Specifically, the opening degree of each of the first valves can be appropriately decided without measuring the NOx concentration distribution in the exhaust gas passage. Therefore, the supply amount of the reductant can be appropriately regulated with a simple configuration.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", and "have" are not intended to be exclusive of other components.

The invention claimed is:

1. A control device for controlling a flue gas denitrizer including a reductant supply part for supplying a reductant to an exhaust gas passage to which an exhaust gas from a boiler is introduced,
  wherein the reductant supply part includes a plurality of nozzles configured to supply the reductant to a plurality of different positions in a space in the exhaust gas passage respectively, and a plurality of first valves for regulating a supply amount of the reductant to the plurality of nozzles respectively,
  wherein the control device comprises:
    a storage part which stores a plurality of opening degree patterns of the plurality of first valves corresponding to a plurality of operational states of the boiler respectively;
    an opening degree pattern acquisition part configured to acquire an opening degree pattern corresponding to a present operational state of the boiler among the plurality of opening degree patterns from the storage part; and
    a first valve control part configured to regulate an opening degree of each of the plurality of first valves, on the basis of the opening degree pattern acquired by the opening degree pattern acquisition part.

2. The control device according to claim 1,
  wherein the plurality of nozzles is configured to supply the reductant to a plurality of different positions when viewed from an exhaust gas flow direction in the exhaust gas passage.

3. The control device according to claim 1,
  wherein the plurality of opening degree patterns includes a plurality of opening degree patterns that vary according to an operational load of the boiler.

4. The control device according to claim 1,
  wherein the plurality of opening degree patterns includes a plurality of opening degree patterns that vary according to a type of fuel combusted in the boiler.

5. The control device according to claim 1,
  wherein the plurality of opening degree patterns includes a plurality of opening degree patterns that vary according to an opening degree of a damper for regulating a flow rate of an exhaust gas in a bypass passage branching from the exhaust gas passage so as to bypass a heat transfer tube disposed in the exhaust gas passage.

6. The control device according to claim 1,
  wherein the reductant supply part includes:
    a reductant supply line through which the reductant to be supplied to the plurality of nozzles flows; and
    a second valve disposed in the reductant supply line, and
  wherein the control device comprises a second valve control part configured to regulate an opening degree of the second valve, on the basis of a nitrogen oxide concentration at a position downstream of the flue gas denitrizer in the exhaust gas passage.

7. The control device according to claim 6,
  wherein the second valve control part is configured to regulate the opening degree of the second valve, on the basis of a nitrogen oxide concentration at an inlet of a stack for discharging an exhaust gas from the exhaust gas passage.

8. A boiler facility, comprising:
a boiler including a combustion furnace for combusting fuel;
a flue gas denitrizer including a reductant supply part for supplying a reductant to an exhaust gas passage to which an exhaust gas from the boiler is introduced; and
a control device according to claim 1 configured to control the flue gas denitrizer.

9. A control method for controlling a flue gas denitrizer including a reductant supply part for supplying a reductant to an exhaust gas passage to which an exhaust gas from a boiler is introduced,
wherein the reductant supply part includes a plurality of nozzles configured to supply the reductant to a plurality of different positions in a space in the exhaust gas passage respectively, and a plurality of first valves for regulating a supply amount of the reductant to the plurality of nozzles respectively,
wherein the control method comprises:
a step of acquiring, from a storage part which stores a plurality of opening degree patterns of the plurality of first valves corresponding to a plurality of operational states of the boiler respectively, an opening degree pattern corresponding to a present operational state of the boiler among the plurality of opening degree patterns; and
a step of regulating an opening degree of each of the plurality of first valves, on the basis of the acquired opening degree pattern.

10. A control program for controlling a flue gas denitrizer including a reductant supply part for supplying a reductant to an exhaust gas passage to which an exhaust gas from a boiler is introduced,
wherein the reductant supply part includes a plurality of nozzles configured to supply the reductant to a plurality of different positions in a space in the exhaust gas passage respectively, and a plurality of first valves for regulating a supply amount of the reductant to the plurality of nozzles respectively,
wherein the control program is configured to cause a computer to execute:
a process of acquiring, from a storage part which stores a plurality of opening degree patterns of the plurality of first valves corresponding to a plurality of operational states of the boiler respectively, an opening degree pattern corresponding to a present operational state of the boiler among the plurality of opening degree patterns; and
a process of regulating an opening degree of each of the plurality of first valves, on the basis of the acquired opening degree pattern.

\* \* \* \* \*